US006215474B1

(12) United States Patent
Shah

(10) Patent No.: US 6,215,474 B1
(45) Date of Patent: Apr. 10, 2001

(54) COMMUNICATION DEVICE WITH MODE CHANGE SOFTKEYS

(75) Inventor: Ketan Shah, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/122,708

(22) Filed: Jul. 27, 1998

(51) Int. Cl.⁷ .................................................. G09G 5/00
(52) U.S. Cl. .................... 345/168; 345/156; 345/901; 345/905; 455/550; 361/679; 361/680
(58) Field of Search .................................. 345/168, 156, 345/901, 905; 340/311.1, 825.17, 825.46; 455/550; 379/55.1–56.3; 361/679, 680

(56) References Cited

U.S. PATENT DOCUMENTS

| | | | |
|---|---|---|---|
| 5,148,473 | * | 9/1992 | Freeland et al. ...................... 455/556 |
| 5,189,632 | * | 2/1993 | Paajanen et al. ..................... 708/109 |
| 5,335,273 | * | 8/1994 | Takagi et al. ......................... 379/433 |
| 5,584,054 | * | 12/1996 | Tyneski et al. ....................... 455/566 |
| 5,673,314 | * | 9/1997 | Olkoski et al. ....................... 379/433 |
| 5,689,824 | * | 11/1997 | Nagai ..................................... 16/232 |
| 5,898,758 | * | 4/1999 | Rosenberg ............................ 379/433 |
| 5,982,883 | * | 11/1999 | Alix et al. ............................. 379/433 |
| 6,046,730 | * | 4/2000 | Bowen et al. ........................ 345/168 |
| 6,141,540 | * | 10/2000 | Richards et al. ....................... 455/90 |

* cited by examiner

Primary Examiner—Richard Hjerpe
Assistant Examiner—Henry N. Tran
(74) Attorney, Agent, or Firm—M. Mansour Ghomeshi

(57) ABSTRACT

A communication device (100) operates in first and second modes of operation including a dispatch mode of operation and a telephone mode of operation. The device (100) includes a main body (124) having a top surface (126) and a cover (102). The cover 102 selectively moves between at least a first position wherein at least a portion of the top surface (126) is covered to provide for selective operation in the dispatch mode and at least a second position wherein the top surface (126) is exposed to provide for selective operation is the telephone mode of operation. The cover (102) includes a see through section (108) covering at least a portion of the display section (114) when the cover (102) is in the first position in order to protect the display section (114) and simultaneously provide access thereto. The cover (102) also includes through access keys (106) which provide access to the keypad (116) even when the cover (102) is closed. The display section (114) includes soft key designation areas (502) and (504) whose textual contents change depending on the position of the cover (102).

8 Claims, 5 Drawing Sheets

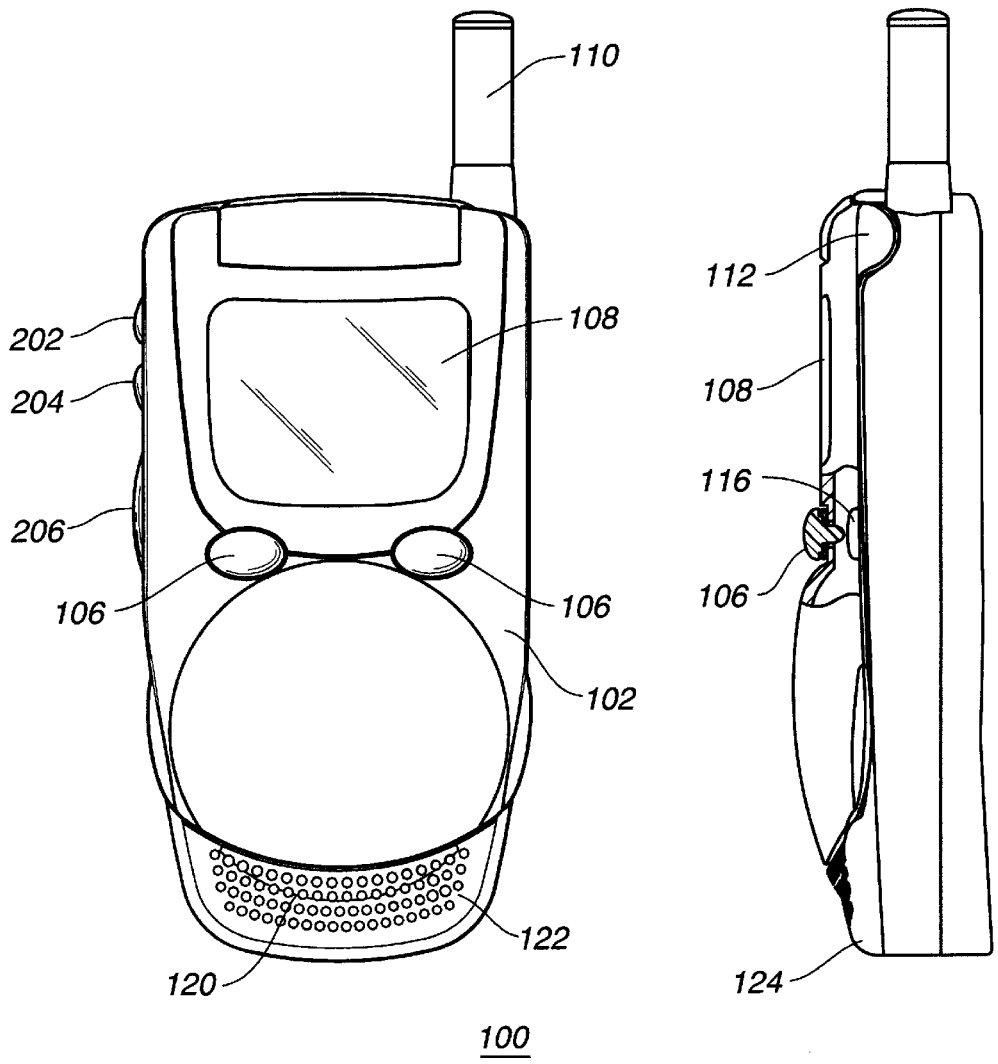
FIG. 1    FIG. 2

COMMUNICATION DEVICE WITH MODE CHANGE SOFTKEYS

FIELD OF THE INVENTION

This invention is in general related to communication devices and more particularly to handheld communication devices.

BACKGROUND OF THE INVENTION

Hand held communication devices appear in a variety of shapes and form factors. Next to pleasant appearance, user ergonomics are among the most important external factors designers consider in designing such products. One aesthetically pleasing form factor uses an extendible section, such as a flip or a clam shell cover. One of the objectives met by these extendible sections is protection of the user interfaces, such as the keypad and the display. Another is the extension of the communication device in the operating mode to provide sufficient length to cover the distance between the ear and mouth of the user. These extendible sections have also been used to respond to an incoming call. In such applications, an incoming call may be answered simply by opening the cover. As such the user does not need to press an answer button to receive a call. A problem with these covers is that operation of the product is greatly hampered when the cover is in the closed mode as neither the keypad nor the display are accessible. Some devices have attempted to partially address this problem by limiting the extendible section to cover only the keypad, hence leaving the display exposed. This approach fails to provide protection to the display which is greatly desired nor would such an approach provide access to the keypad when the cover is closed. Accordingly, a need exists for a device that overcomes the deficiencies of the prior art.

BRIEF DESCRIPTION OF THE DRAWINGS

FIG. 1 shows a communication device in a first mode in accordance with the present invention.

FIG. 2 shows a side view of the communication device of FIG. 1.

DETAILED DESCRIPTION OF THE PREFERRED EMBODIMENT

In order to overcome the deficiencies of the prior art in effectively utilizing communication devices having a cover, the present invention provides for a see-through cover that provides access to the display of the communication device even when the cover is closed. In addition, through access keys are provided to accommodate access to the keypad when the cover is closed. Along with the access keys, the display includes soft key designation areas whose textual contents change depending on the position of the cover. As such, the communication device may be used regardless of the position of the cover. This is particularly useful with dual mode communication devices where the functionality of the device may be optimized by the position of the cover.

Figure 3:
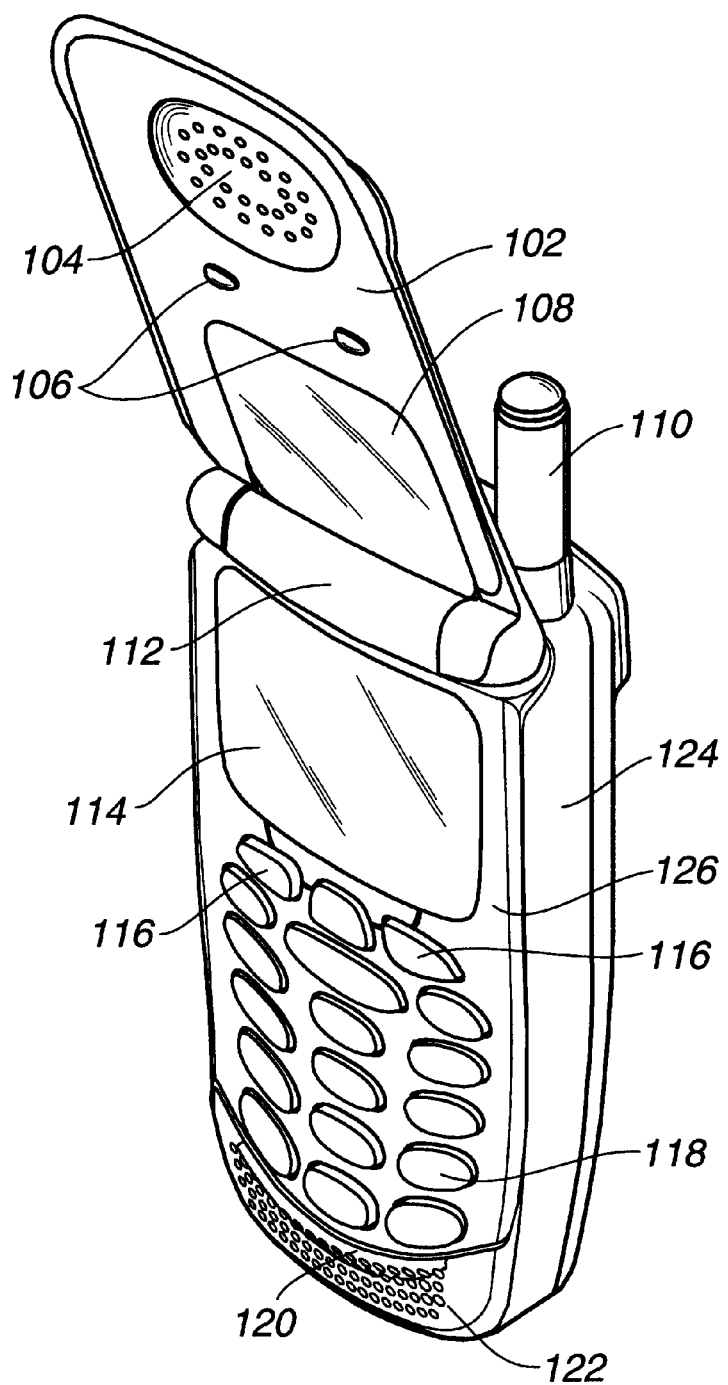
FIG. 3 shows a communication device in a second mode in accordance with the present invention.

FIGS. 1, 2, and 3 show an electronic device, such as a communication device 100 in the open and closed positions, respectively. FIG. 1 shows the communication device 100 in the closed mode and including a moveable housing element 102 on which push buttons 106 are located. Keys 106 are shown preferably directly underneath the display to provide for soft key features. The cover 102 covers at least a portion of the top surface of the device 100. Included in the coverage zone of the cover 102 is the display 114 and the keypad 118. The operation of the keypad 118 in this embodiment is similar to the keys of a regular telephone or other communication devices as it known in the art. A speaker 120 presents the received audio to the user while a microphone 122 inputs the audio for transmission. A Push-To-Talk (PTT) button 206 is located preferably on the side of the radio 100 and provides for the initiation of communication in the dispatch mode. Additional buttons 202 and 204 provide such functions as volume control or frequency selection, among other things. In alternative embodiments, the PTT switch may be located on the top surface, similar to the TalkAbout™ family of products being offered by Motorola Inc., Schaumburg, Ill.

Although switches 204 and 206 have been shown here to control the volume level, an alternative embodiment may use them as providing a function similar to the soft keys 116. In such an embodiment, these keys 202 and 204 may be used to provide the user with various functions as guided through the display terminal 114. e.g. the function of the keys may change from volume control in one mode to ID number locator in another to message scrolling in a third mode. These keys may be placed beneath the display 114 so that their function as soft keys may be enhanced. In such a place, keys 202 and 204 may be used more definitively as soft keys in the Y (vertical) dimension as are keys 116 in the X (horizontal) dimension. This alternative embodiment may provide additional flexibility to the communication device 100 in either mode and has particular benefit in the closed cover mode.

The user wishing to place a dispatch call may enter the private ID number of the second party and proceed to talk while the PTT button is pressed. For this, however, the cover must be opened for access to the keypad. The present invention eliminates the need to open the cover by providing pass through keys 106 and the see through window 108. These keys are available on the cover and may be used to scroll through a list of private IDs. A desired private ID may be searched and chosen from the memory and displayed on the display 114, seen through the see through area 108. Once located, the user proceeds to communicate by pressing the PTT switch 206. As such, the need to open the cover 102 is eliminated.

Figure 5:
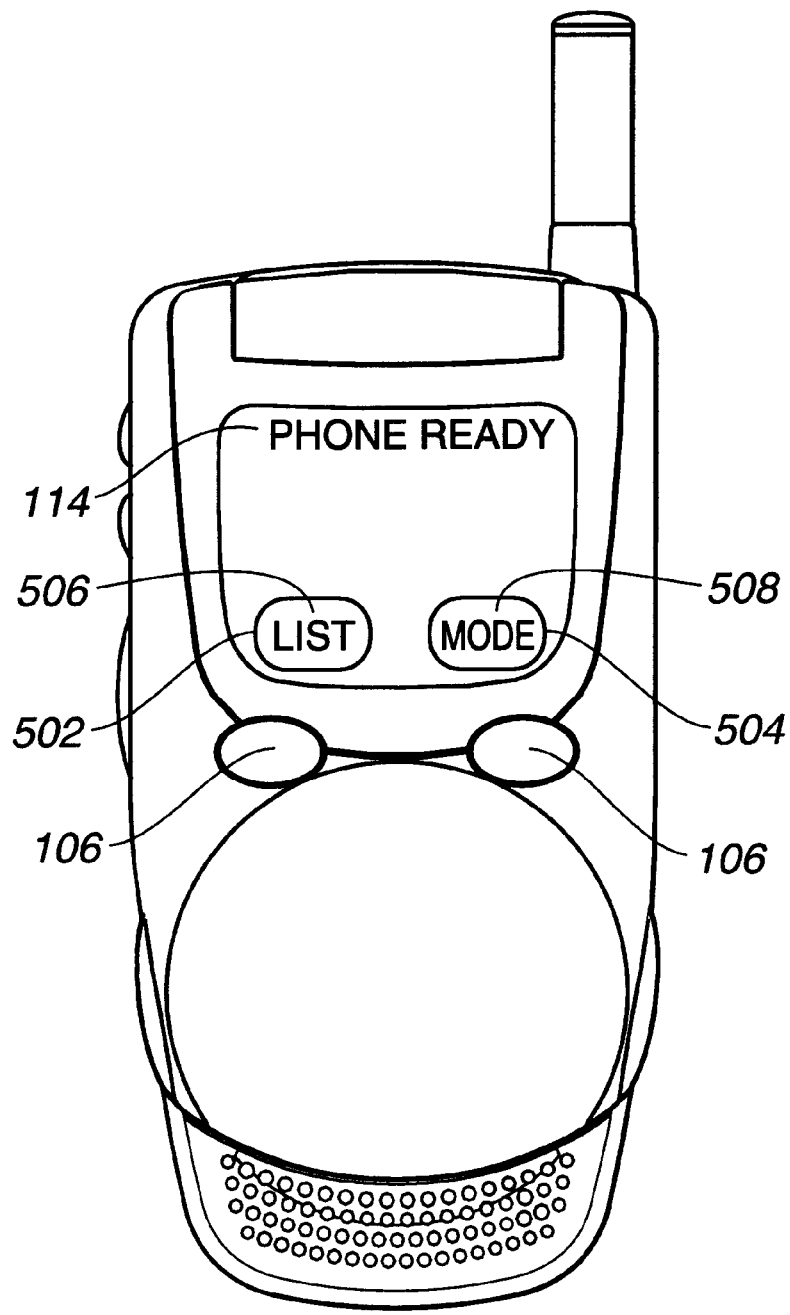
FIG. 5 shows a first configuration of the display terminal of the communication device in accordance with the present invention.

In the preferred embodiment, the two buttons 106 are used as soft keys. A soft key is referred to a key whose function changes depending on the application being run. The functions associated with the keys 106 are those meaningful and appropriate for dispatch operation, such as scrolling through the memory to locate the private ID number of a particular addressee. Alternatively, these keys may be used to access other features, such as changing the mode of operation or the operating zone of the device 100. To accommodate these soft keys 106, the display 114 includes soft key designation areas 502 and 504 (FIG. 5). These areas are updated with text representing new modes or functions as determined by the operating mode of the device 100. As the mode of the device 100 is changed, with the cover 102 open or closed, the function of these soft keys 106 change as well. This represents a significant benefit as extended functionality may not be denied when the cover 102 is closed.

In an alternative embodiment, the device 100 may include a voice recognition circuitry to be used in locating a particular addressee in either modes of operation. With such a circuit, the user may enter the ID number of a particular addressee simply by requesting it via voice. The recognition circuitry proceeds to recover the voice and locate the ID number associated with the name.

The communication device 100 as presented in this preferred embodiment, is capable of providing multiple modes of operation. Namely, the device 100 may operate in telephone or dispatch mode of operation. Alternatively, messaging or data modes may be accommodated. In the messaging mode, the device 100 may be used to receive pages as any other pager available as a stand alone product. In the data mode of operation, the device 100 may be used as a portable data machine. In addition, the device 100 may be used as a telephone. Utilizing the keys 106, an incoming call may be answered without opening up the cover. In other words, the user may choose to answer an incoming call by either opening the cover 102 or simply pressing one of the keys 106. In either case the present invention offers a unique advantage over the prior art. This advantage is provided via the see through section 108. The caller ID feature of the device 100 displays the number of an incoming call on the display 114. Seen through the clear area 108, the user may decide whether to answer the incoming call or not. This is not possible in the communication devices of the prior art which are equipped with a traditional cover. These devices all answer an incoming call as soon as the cover is opened. As such, the identity of an incoming call is not known to the user before the call is answered. Conveniently, and in accordance with the present invention, partial access to the device 100 is available even when the cover 102 is closed.

In summary, the device 100 provides enhanced functionality by providing access to the display and keypad, even when the cover 102 is closed. The see through section 108 may cover all or a portion of the display 114. As such, displayed information may be viewed with the cover 102 open or closed. Keys 106 provide access to the keypad 118 when the cover is closed. With such access to the keypad and the display, the user can use the device 100 in any mode with the cover open or closed, hence improving product usability.

Referring to FIG. 3, the communication device 100 is shown with the cover 102 open. The communication device 100 includes a body housing element 124 which accommodates the components to provide telephone and dispatch functionality thereto. The housing element 124 includes a top surface 126, the display 114, and the keypad 118. The movable housing element 102 is coupled to the housing element 124 via a hinge 112. The moveable housing element 102 selectively moves between at least a first position wherein at least a portion of the top surface 126 is covered to provide for selective operation in the dispatch mode and at least a second position wherein the top surface 126 is exposed to provide for selective operation is the telephone mode of operation. The moveable housing element 102 includes the see through section 108 covering at least a portion of the display section 114 when the movable housing element 102 is in the first position in order to protect the display section 114 and simultaneously provide access thereto. In place of the hinge 112 embodiments, other similar mechanisms, such as a railing or a sliding cover may be used to couple the moveable housing element 102 to the housing element 124. An antenna 110 is used for the efficient transmission and reception of radio frequency signals.

In the open mode, the entire keypad 118 is available to the user. As such, the user may place a dispatch call by entering the entire private ID number of an addressee and proceed to communicate using the PTT button 206. Alternatively, the user may place a telephone call by entering the number in the telephone mode and proceed to communicate. As can be seen more clearly from FIGS. 2 and 3 and in accordance with the preferred embodiment, the keys 106 pass through from the front surface to the back surface of the cover 102. As such, keys 106, when pressed, couple with keys 116 which are located directly below them. This coupling communicates a push applied to keys 106 from the front surface of the cover area to the keys 116 on the top surface 126. By providing the pass through keys 106, the same number of keys may be used to provide the device 100 with functionality with the cover 102 open or closed. In other words, there is no need to duplicate keys in order to accommodate the various modes in which the device 100 may be used.

In summary, the device 100 operates in at least two modes of operation. In a first mode of operation and with the cover open, it is able to place and receive phone calls just as any other wireless telephone. In a second mode of operation and with the cover closed, it can be utilized as a walkie talkie utilizing dispatch operation. A push-to-talk (PTT) bottom is used to facilitate the dispatch mode. A cover 102 is used to selectively cover at least a portion of the top surface 126 when the cover is closed. The cover 102 includes a see-through window 108 which covers the display area 114 in the closed mode in order to protect the display terminal 114 and while at the same time providing access thereto. In this mode of operation, the user can view the names or numbers of parties he is wishing to contact without having to open the cover which is otherwise required in the communication devices of the prior art. In a third mode, a user may retrieve data messages with the cover 102 closed simply by navigating through the application program using soft keys 106.

Figure 4:
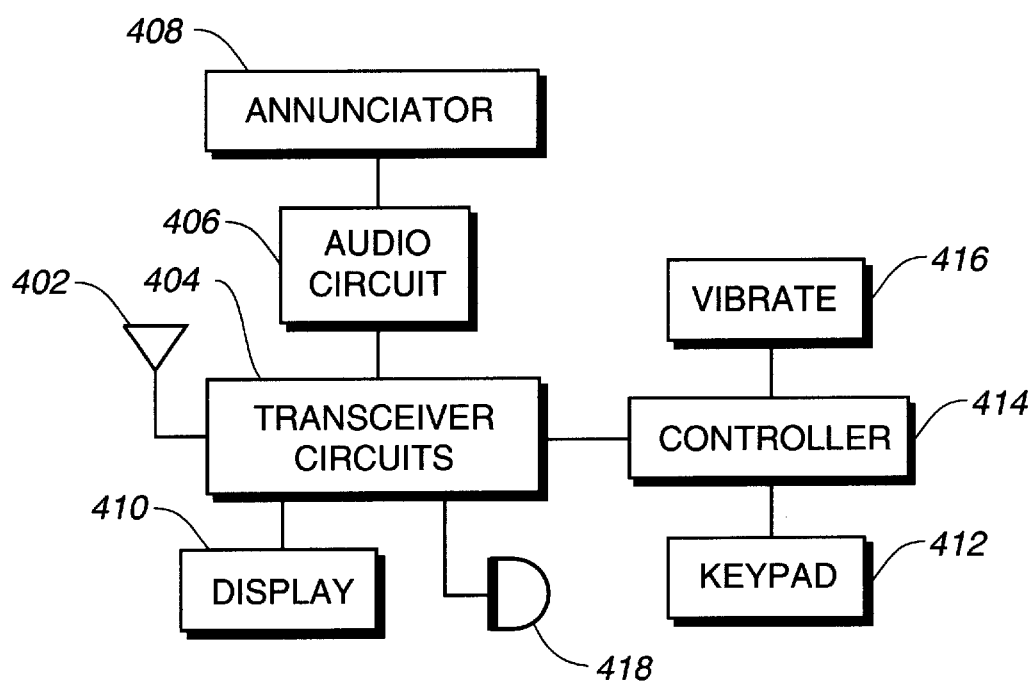
FIG. 4 shows a block diagram of the communication device in accordance with the present invention.

Referring to FIG. 4, the block diagram of the communication device 100 in accordance with the present invention is shown. Antenna 402 is coupled to transceiver circuits 404 where radio frequency signals received thereby are demodulated to baseband. Audio components of the demodulated signals are coupled to audio circuits 406 and then to enunciator/earpiece 408. The enunciator may be used to alert the user of a received call independent of the position of the cover 102. Alternatively, a speaker may be used in place of or in addition to the enunciator 408. The data components of the demodulated signals are coupled to a display 410. A keypad 412 provides key entries to a controller 414. These key entries are then coupled to the transceiver circuits for modulation at the proper frequency before they are transmitted via antenna 402. In addition to the enunciator 408, a vibrator 416 may be utilized to indicate to the user the presence of an incoming call. A microphone 418 is used for the coupling of audio to the transceiver circuits 404.

Figure 6:
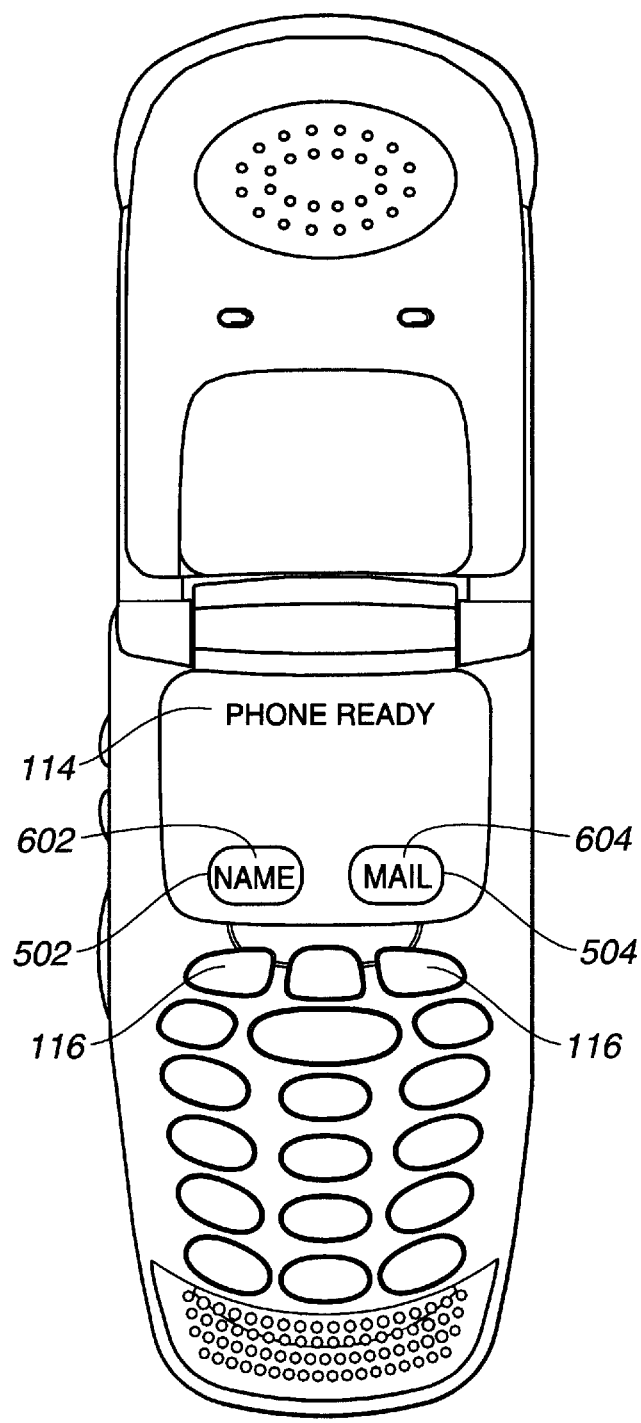
FIG. 6 shows a second configuration of the display terminal of the communication device in accordance with the present invention.

Referring to FIGS. 5 and 6, the display 114 is shown with the cover 102 closed and open, respectively. In the closed mode of the preferred embodiment, the soft key designation area 502 provides a list 506 where the user may scroll for possible names. The soft key designation area 504 is used to provide switching between the modes of operation, 508. The definition of the soft keys 106 may change as the mode of operation of the device 100 changes. In other words, the text 506 and/or 508 may change when the operating mode transitions from telephone mode to dispatch and so on.

When the cover 102 is open, the display soft key definitions change to better represent the best use of the device 100. As seen in FIG. 6, the text of the designation areas 502 and 504 changes to "Name" 602 and "Mail" 604, respectively. As such, the device 100 can accommodate features that are commensurate with an open cover. As can be seen, with changes to the definition of the soft keys 106 a user is no longer required to sacrifice the full functionality of the device 100 just because the cover 102 is closed. Now, the device 100 senses the position of the cover and acts to reflect that change in the text of the soft key designation areas 502 and 504. With the operation of the soft keys 106 being dynamic relative to the position of the cover, the product performance does not have to be sacrificed to create a balance between the closed and open modes. This change in the soft key function relative to the position of the cover 102 is in addition to the changes implemented as the operating mode of the device 100 changes. In the preferred embodiment, the sensor to detect the mode of the cover 102 utilizes a magnet along with a detector. Once the magnet is in the close proximity of the detector, a mode change signal is communicated by the detector to the controller 414 initiating the change to the text of the soft keys.

The present invention provides two significant benefits to the users of a two-way communication device. The first benefit is that the display 114 is viewable through a see-through window 108. This accessibility renders the device 100 more versatile in that multiple modes of operation along with multiple housing configuration can be accommodated without departing from the aesthetics associated and preferred with each mode of operation. With the cover 102 closed, the device 100 may be used with limited access to the keypad 118 through the soft keys 106. This closed mode is particularly beneficial in dispatch or data modes. In dispatch, the press of the push-to-talk button 206 initiates a transmission. In this mode, the user may desire to locate the private ID number of a particular unit. To do this, the user presses the activators 106 thereby activating keys 116. In the data mode of operation, keys 106 may be used to retrieve data since the display is accessible via the see-through window 108. As such, the functions of keys 116 do not have to be duplicated to accommodate the multiple modes the unit 100 provides.

In the open mode of operation, conversely, the device 100 can accommodate phone communications as provided by similar devices in the prior art. As can be seen, the versatility of the device 100 has been expanded by providing full functionality in one mode of operation, namely open cover; and limited operation, namely closed cover. Although the closed cover mode has been discussed in a dispatch environment, one can see that limited functionalities over the device 100 in the interconnect mode may be accomplished by the cover in the closed mode. In such circumstances, the access keys 106 may be used to locate a telephone number for a desired party and utilizing a speaker phone mode of operation a call can be traced to that party without having to open the cover 102.

What is claimed is:

1. An electronic device having first and second modes of operation, comprising:

a body housing element for accommodating electronic components including a display and a keypad, the housing having a top surface on which the display and the keypad are located;

a movable housing element for covering at least a portion of the top surface of the housing when in a closed mode and providing access to the display and the keypad when in an open mode, the cover including:

a see through section located substantially over the display in order to provide access thereto when the cover is in the closed mode; and at least one activator to access the keypad in the closed mode;

wherein the display having at least one soft key designation visible through the see-through section, which designation changes from a first designation to a second designation depending on the mode of the cover;

the keypad including a soft key associated with said at least one soft key designation; and wherein said at least one activator is utilized for activating said soft key.

2. The electronic device of claim 1, wherein the first mode includes a telephone mode of operation.

3. The electronic device of claim 1, wherein the first mode includes a messaging mode of operation.

4. The electronic device of claim 1, wherein the first mode includes a dispatch mode of operation.

5. The communication device of claim 1, wherein the movable housing element is coupled to the housing element via a hinge.

6. The communication device of claim 1, further including an enunciator to indicate a received call independent of the position of the movable housing element.

7. The communication device of claim 6, wherein the enunciator includes a vibrator.

8. The communication device of claim 1, wherein the movable housing element provides for the switching of one mode of operation to another.

\* \* \* \* \*

UNITED STATES PATENT AND TRADEMARK OFFICE
CERTIFICATE OF CORRECTION

PATENT NO.    : 6,215,474 B1                                       Page 1 of 1
DATED         : April 10, 2001
INVENTOR(S)   : Ketan Shah It is certified that error appears in the above-identified patent and that said Letters Patent is hereby corrected as shown below:

<u>Title page,</u>
Title, delete the present title and insert therefor
-- COMMUNICATION DEVICE WITH MODE CHANGE SOFT KEYS --.

Signed and Sealed this

Thirtieth Day of April, 2002

*Attest:*

*Attesting Officer*

JAMES E. ROGAN
*Director of the United States Patent and Trademark Office*